US008384239B2

(12) United States Patent
Campbell et al.

(10) Patent No.: US 8,384,239 B2
(45) Date of Patent: Feb. 26, 2013

(54) DC SOURCE ASSEMBLIES

(75) Inventors: Jeremy B. Campbell, Torrance, CA (US); Steve Newson, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 738 days.

(21) Appl. No.: 12/503,946

(22) Filed: Jul. 16, 2009

(65) Prior Publication Data

US 2011/0013429 A1    Jan. 20, 2011

(51) Int. Cl.
*B60L 1/00* (2006.01)
(52) U.S. Cl. ....................................... 307/10.1
(58) Field of Classification Search .............. 307/10.1
See application file for complete search history.

(56) References Cited

U.S. PATENT DOCUMENTS

| | | | |
|---|---|---|---|
| 4,169,970 A | | 10/1979 | Opiela et al. |
| 6,127,042 A * | | 10/2000 | Tamic ........................... 428/461 |
| 6,898,092 B2 * | | 5/2005 | Briere et al. .................... 363/39 |
| 7,079,379 B2 | | 7/2006 | Yamaguchi et al. |
| 7,085,144 B2 | | 8/2006 | Taguchi et al. |
| 7,443,705 B2 | | 10/2008 | Ito |
| 7,525,825 B2 | | 4/2009 | Korich et al. |
| 7,728,652 B2 | | 6/2010 | Sohara et al. |
| 7,794,871 B2 * | | 9/2010 | Kim .............................. 429/159 |
| 8,054,013 B2 * | | 11/2011 | Oyobe et al. .................. 318/139 |
| 2004/0257841 A1 | | 12/2004 | Taguchi et al. |
| 2004/0264220 A1 | | 12/2004 | Briere et al. |
| 2005/0003710 A1 * | | 1/2005 | Congdon et al. .............. 439/620 |
| 2008/0197881 A1 | | 8/2008 | Bertin |
| 2009/0118916 A1 | | 5/2009 | Kothari et al. |
| 2010/0014988 A1 | | 1/2010 | Tsutsui et al. |
| 2010/0027305 A1 | | 2/2010 | Oyobe et al. |
| 2010/0204860 A1 | | 8/2010 | Mitsutani |
| 2010/0301975 A1 | | 12/2010 | Hammond |

FOREIGN PATENT DOCUMENTS

| | | |
|---|---|---|
| DE | 602004012949 T2 | 5/2009 |
| EP | 2131481 A1 | 12/2009 |
| JP | 2008154399 A | 7/2008 |
| WO | 2009034882 A1 | 3/2009 |

OTHER PUBLICATIONS

German Office Action dated Jul. 5, 2011 for German Patent Application No. 10 2010 029 461.6.
US Notice of Allowance for U.S. Appl. No. 12/432,438 mailed on Jun. 10, 2011.

* cited by examiner

*Primary Examiner* — Hal Kaplan
(74) *Attorney, Agent, or Firm* — Ingrassia Fisher & Lorenz, P.C.

(57) ABSTRACT

Embodiments of DC source assemblies of power inverter systems of the type suitable for deployment in a vehicle having an electrically grounded chassis are provided. An embodiment of a DC source assembly comprises a housing, a DC source disposed within the housing, a first terminal, and a second terminal. The DC source also comprises a first capacitor having a first electrode electrically coupled to the housing, and a second electrode electrically coupled to the first terminal. The DC source assembly further comprises a second capacitor having a first electrode electrically coupled to the housing, and a second electrode electrically coupled to the second terminal.

13 Claims, 4 Drawing Sheets

DC SOURCE ASSEMBLIES

STATEMENT REGARDING FEDERALLY SPONSORED RESEARCH OR DEVELOPMENT

This invention was made with Government support under DOE AIETS contract number DE-FC26-07NT43123, awarded by the US-Department of Energy. The Government has certain rights in this invention.

CROSS-REFERENCE TO RELATED APPLICATION

The present application relates to co-owned and co-pending patent application U.S. Ser. No. 12/432,438, filed Apr. 29, 2009.

TECHNICAL FIELD

Embodiments of the present invention generally relate to power inverter systems, and more particularly relate to direct current (DC) source assemblies of a power inverter system of a vehicle.

BACKGROUND OF THE INVENTION

Electric and hybrid electric vehicles often use sources of high voltage such as battery packs or cells that deliver direct current (DC) to drive vehicle motors, electric traction systems (ETS), and other vehicle systems. An ETS is typically under the control of a variable motor drive (VMD) module that generally includes at least one power inverter system designed to convert the DC source input signal to an alternating current (AC) output signal compatible with electric motors and other various electrical components. Such power inverter systems generally include both integrated gate bipolar transistor (IGBT) and capacitor modules interconnected by bipolar busbar and/or cabling assemblies that distribute current throughout the inverter.

The IGBT module generally includes a plurality of individual power modules for converting the DC input signal to an AC output signal. Because accompanying electronic components such as AC and DC cables, busbar assemblies, and other discreet and integrated components such as power diodes and individual IGBTs often have inherent capacitance and/or inductance, such cycling can generate stray AC currents (or "common mode" currents). Common mode currents can produce generally undesirable electromagnetic interference (EMI) radiation that can adversely affect the performance of other nearby radio frequency-based electronic systems such as radio receivers, cellular phones, and the like. Because EMI emissions generally increase with the distance that common mode currents travel from ground to reach their positive or negative busbar source, power inverters on many vehicles include filtering capacitors within a grounded inverter chassis connected between busbars and/or cabling and the chassis that provide such currents with a shortened, low impedance pathway from ground to source.

However, filtering capacitors configured in this manner present several drawbacks. Capacitor filters are located away from the power modules and IGBT devices where many common mode currents originate. As a result, the "loop area" or area circumnavigated by these currents on the ground path may be sufficient to create considerable levels of EMI radiation. This condition is potentially enhanced in vehicles wherein the power inverter chassis and DC source have appreciable separation. Further, achieving a reliable connection between capacitor electrodes and busbar/chassis surfaces can be especially challenging, and often adds significantly to fabrication/assembly cost and complexity.

Accordingly, it is desirable to provide a power inverter system with reduced EMI radiation. Further, it is also desirable that such an assembly be simpler to fabricate than prior assemblies. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments DC source assemblies are provided for reducing EMI radiation. An embodiment of the apparatus comprises a DC source having a first terminal and a second terminal and a grounded conductive member. The DC source further comprises a first capacitor having a first electrode electrically coupled to the conductive member and a second electrode electrically coupled to the first terminal and a second capacitor having a first electrode electrically coupled to the conductive member, and having a second electrode electrically coupled to the second terminal.

A power inverter system suitable for deployment in a vehicle having an electrically grounded chassis is provided. The system comprises a DC source assembly that includes a housing disposed within the vehicle and electrically coupled to the chassis, a DC source disposed within the housing and having a first terminal and a second terminal, and an EMI filter electrically coupled to the housing and the DC source. The system further includes a power inverter assembly electrically coupled to the DC source assembly.

An embodiment of a DC source assembly for deployment in a vehicle having an electrically grounded chassis includes a housing electrically coupled to the vehicle chassis and a DC source disposed within the housing. The DC source assembly further includes a first terminal contactor electrically coupled to the DC source, a second terminal contactor electrically coupled to the DC source, a first capacitor having a first electrode electrically coupled to the first terminal contactor and a second electrode electrically and physically, directly connected to the housing, and a second capacitor having a first electrode electrically coupled to the second terminal contactor and a second electrode electrically and physically, directly connected to the housing.

DESCRIPTION OF THE DRAWINGS

Embodiments of the present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The various embodiments of the present invention described herein provide assemblies for suppressing EMI radiation by filtering common mode currents from a vehicular power inverter system. These assemblies, which include at least one pair of capacitors, may be integrated into a DC source assembly disposed in any convenient location within the vehicle. An embodiment includes a first capacitor coupled between vehicle ground and a positive DC source pole (or terminal), and a second capacitor coupled between ground and a negative DC source terminal. The capacitors provide a low impedance pathway from ground for common mode currents nearer to the source thereof, thus decreasing current loop area and suppressing EMI radiation thereby.

Figure 1:
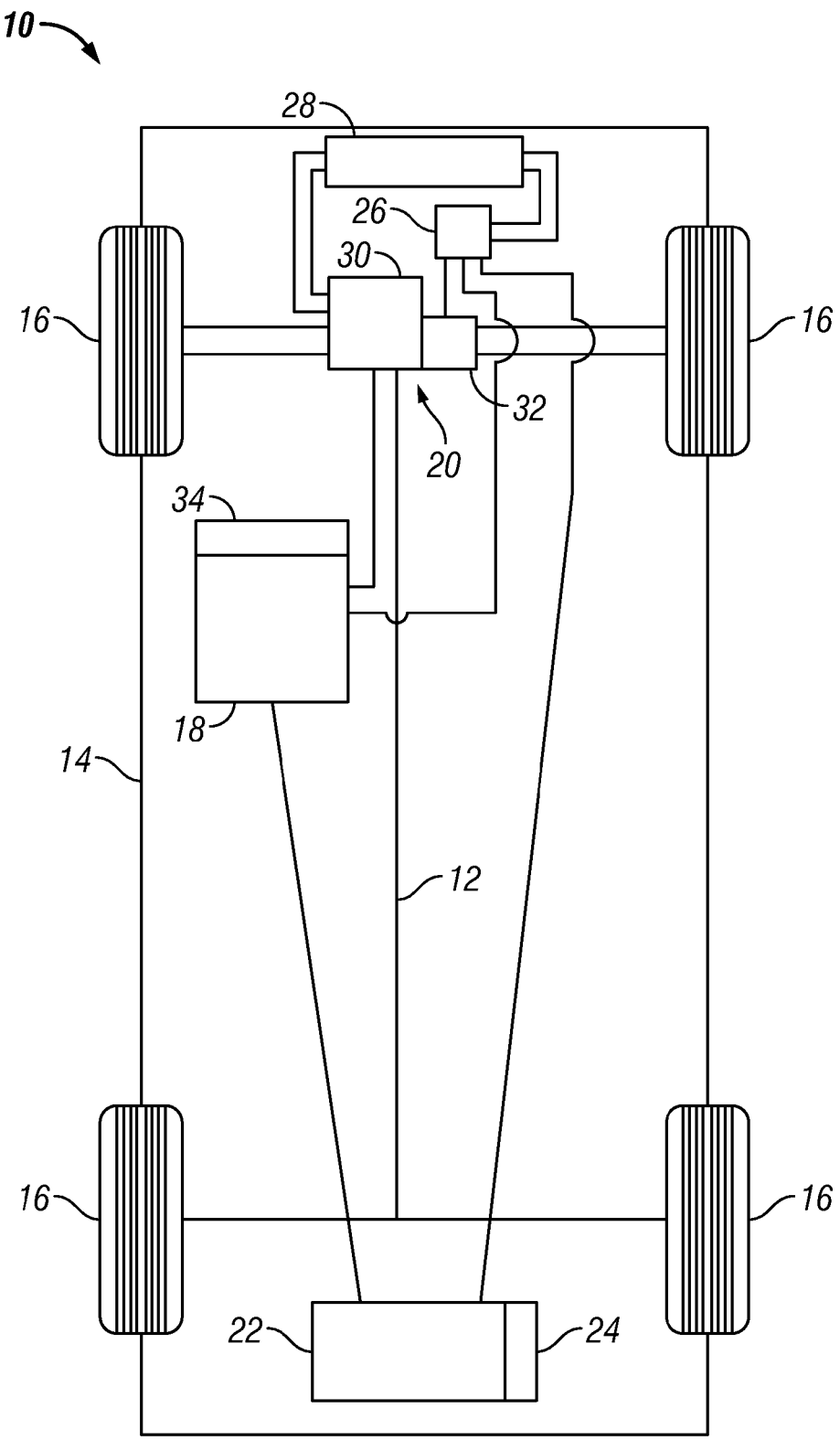
FIG. 1 is a schematic diagram of an exemplary vehicle illustrating the manner in which a power inverter and a DC source are integrated with various sub-components of the vehicle in accordance with an example embodiment.

FIG. 1 is a schematic diagram of an exemplary vehicle 10 in accordance with an exemplary embodiment of the present invention. Vehicle 10 includes a chassis 12, a body 14, four wheels 16, and an electronic control system (or electronic control unit (ECU)) 18. The body 14 is arranged on the chassis 12 and substantially encloses the other components of vehicle 10. The body 14 and the chassis 12 may jointly form a frame. The wheels 16 are each rotationally coupled to the chassis 12 near a respective corner of body 14.

Vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, vehicle 10 is a hybrid vehicle that further includes an actuator assembly (or powertrain) 20, a battery (or DC source) assembly 22, a battery state of charge (SOC) system 24, a power inverter assembly 26, and a radiator 28. Battery assembly 22 may be located within any suitable region of vehicle 10, such as, for example, in the rear of the vehicle, and is electrically coupled to various electrical components including power inverter assembly 26 using cabling and/or busbars. Battery assembly 22 includes a capacitor module (not shown) configured to reduce low frequency conducted and radiated emissions. Actuator assembly 20 suitably includes an internal combustion engine 30 and an electric motor/generator (or motor) system (or assembly) 32. In an embodiment, battery assembly 22 includes a lithium ion (Li-ion) battery including any number of cells, although the battery assembly 22 may include a different type of battery cell, in other embodiments. ECU 18 may also include a variable motor drive module 34 configured to control various vehicular functions including but not limited to electric motor torque and speed.

Power inverter assembly 26 may include capacitor and IGBT modules (not shown) as well as other conductive elements configured to provide a pathway for current flow between these and other associated electronic components such as DC source assembly 22. These conductive elements may include one or more busbars used in conjunction with conductive cabling. Such busbar assemblies may be configured as desired to compactly fit between capacitor and IGBT module assemblies and to shorten the current pathway between these components to minimize the overall system inductance.

Figure 2:
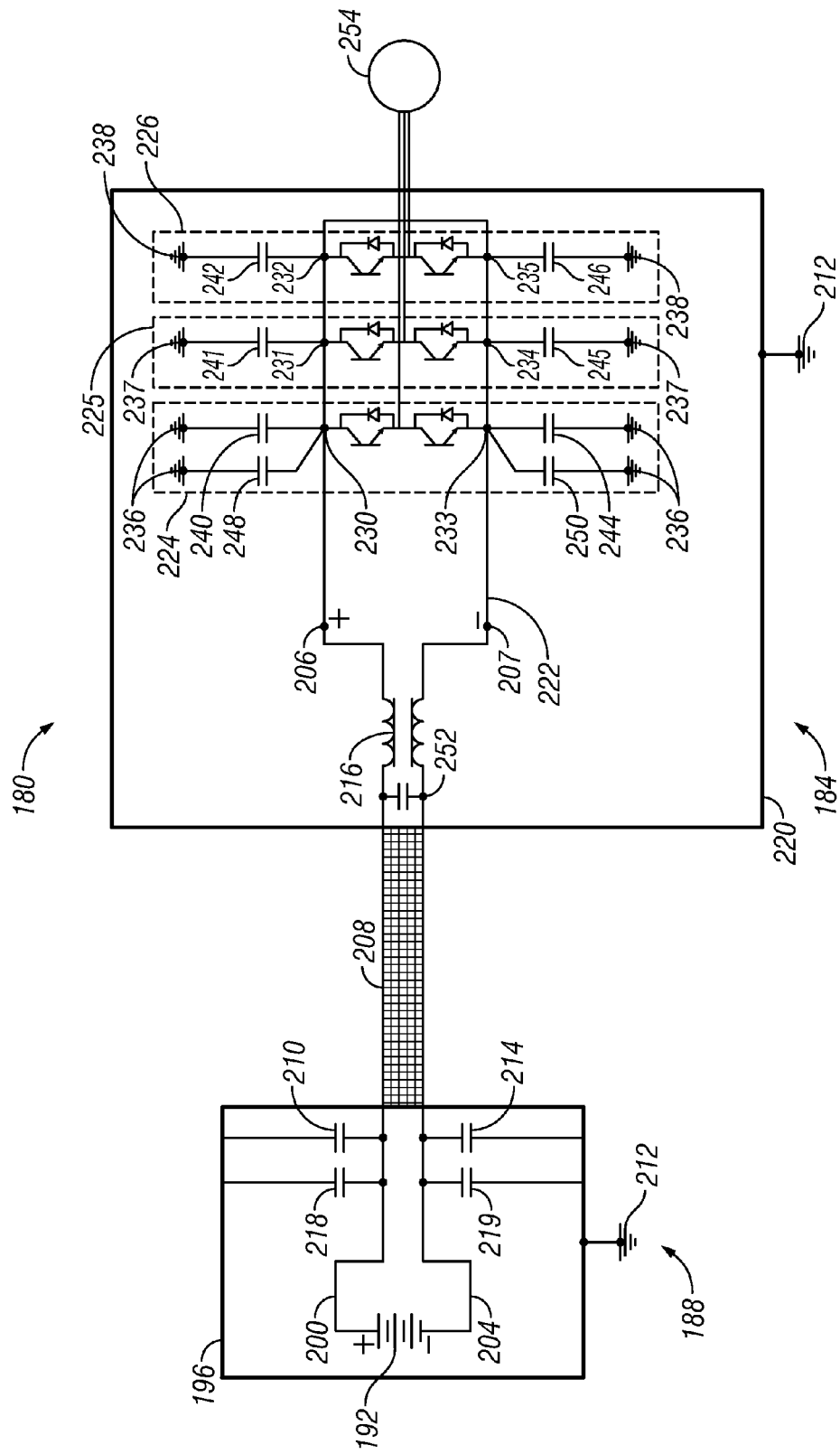
FIG. 2 is a schematic diagram of a vehicular power inverter system including power inverter and DC source assemblies of the type deployable in the vehicle depicted in FIG. 1, and having filtering capacitors in accordance with an example embodiment.

FIG. 2 is a schematic diagram depicting selected elements of a power inverter system 180 suitable for deployment in a vehicle. The power inverter system 180 includes a power inverter 184 electrically coupled to a DC battery assembly 188, in accordance with another exemplary embodiment. DC battery assembly 188 includes a housing (or chassis) 196 and a DC battery 192 disposed therein, having positive and negative terminals 200 and 204, respectively, coupled to positive and negative DC input nodes 206 and 207, respectively, within power inverter 184. In accordance with an example embodiment, housing 196 is disposed within a vehicle having an electrically grounded chassis, depicted as vehicle ground 212 in FIG. 2. Housing 196 may be made of any suitable material including a conductive material grounded to the vehicle ground 212 (e.g. grounded vehicle chassis 12 (FIG. 1)), and useful as a grounding source for electrical components housed therein. Housing 196 may also contain at least one grounded conductive member in electrical communication with ground 212 suitable for this purpose, for example if housing 196 is not made from a conducting material. Electrical coupling between DC battery assembly 188 and power inverter 184 includes a bipolar cable assembly 208 that may include suitable shielding. Those of skill in the art will appreciate that DC battery assembly 188 may be disposed at any suitable distance from power inverter 184 including at substantially opposite ends of the vehicle, and may contain additional components for electrically coupling DC battery 192 to inverter 184 such as, for example, one or more busbars.

In accordance with an exemplary embodiment, to reduce conducted and radiated emissions, an EMI filter is disposed within the DC battery assembly 188. A battery pack, e.g., DC battery assembly 188, may provide a near ideal location for components of the EMI filter due to the available space or volume, lower temperatures, and simpler packaging of a battery pack in comparison, for example, to power inverter 184. A battery pack ordinarily operates at lower temperatures than an inverter due, in part, to the location of the battery pack within the vehicle. A battery pack is typically located towards the rear of a vehicle sheltered from dirt and moisture and, particularly, away from high heat producing elements of the vehicle, such as the ETS and the inherent temperatures of an internal combustion engine. Placing EMI filter components in the battery pack may also provide cost savings over placement in a power inverter because lighter weight and lower cost components may be utilized over specially packaged and/or de-rated electrical capacitors that would be required to meet the temperature and reliability ratings of a typical power inverter.

In accordance with this exemplary embodiment, an EMI filter comprising a plurality of Y-capacitors disposed between line (positive and negative terminals) and vehicle ground are employed. More particularly, DC battery assembly 188 includes a first capacitor 210 disposed within housing 196 having a first electrode coupled to positive terminal 200, and having a second electrode coupled to vehicle ground 212. Assembly 188 also includes a second capacitor 214 disposed within housing 196 having a first electrode coupled to negative terminal 204, and having a second electrode coupled to ground 212. First and second capacitors 200 and 214 provide a low impedance path to couple common mode current from positive DC bus (positive terminal 200) to chassis (vehicle ground 212) and negative DC bus (negative terminal 204) to chassis (vehicle ground 212), thereby reducing low frequency conducted and radiated emissions. Coupling of capacitor electrodes to battery terminals may be done conventionally via coupling to cable assembly 208 or to a busbar (not shown) if one is used. In another embodiment, a second pairing of capacitors is coupled between each of battery terminals 200 and 204 and ground 212 parallel to first and second capacitors 210 and 214. That is, a third capacitor 218 has a first electrode coupled to positive terminal 200, and a second electrode coupled to vehicle ground 212. A fourth capacitor 219 is similarly coupled between negative terminal 204 and ground 212. Such a configuration may be used to reduce the internal resistances and inductances of the Y-capacitors, thereby further reducing EMI radiation.

First, second, third, and fourth capacitors 210, 214, 218, and 219 may have any suitable capacitance rating that may depend upon factors that include switching frequency of the inverter and internal battery pack impedance. In one embodiment, each of capacitors 210, 214, 218, and 219 have a capacitance in a range of from about 100 picofarads (pF) to about 5.0 microfarad (µF). In another embodiment, each of capacitors 210, 214, 218, and 219 have a capacitance in a range of from about 100 nanofarads (nF) to about 0.5 microfarad (µF). The capacitances of capacitors 210, 214, 218, and 219 may be identical or different from each other, in various embodiments, and/or may be larger or smaller than the above-given ranges. In addition, each of capacitors 210, 214, 218, and 219 may include a single, discrete component or a plurality of capacitive components, in various embodiments.

In accordance with one embodiment, each of capacitors 210, 214, 218, and 219 may be comprised of a film or polypropylene material and have a physical dimension of about 1.2 inch×0.5 inch×0.5 inch to a maximum of 1.75 inch×1 inch×1 inch. The materials and dimensions of capacitors 210, 214, 218, and 219 are not essential for packaging, however, and capacitors 210, 214, 218, and 219 may be comprised of different materials and/or have different physical dimensions, in other embodiments.

Power inverter 184 includes an IGBT module 222 which may have any number of individual power modules, and a busbar 216, each housed within a housing (or chassis) 220 that is electrically coupled to vehicle ground 212. More particularly, housing 220 may be fabricated of a conductive material and grounded to the vehicle ground 212 to provide a ground source for housed electrical components, or may contain one or more grounded conductive members suitable for this purpose. In the example depicted in FIG. 2, IGBT module 222 includes three power modules 224-226, each power module having a positive DC input node coupled to positive DC input node 206 (positive node of busbar 216), a negative DC input node coupled to negative DC input node 207 (negative node of busbar 216), and a ground node coupled to vehicle ground 212. For example, power module positive DC input nodes 230-232 are each electrically coupled to positive DC input node 206, power module negative DC input nodes 233-235 are each electrically coupled to negative DC input node 207, and power module grounding nodes 236-238 are each electrically coupled to vehicle ground 212. The positive and negative input nodes of each power module each include at least one IGBT/power diode pair, as is commonly used. In accordance with an embodiment, each power module DC input node includes a capacitor electrically connected between that node and a ground node on the base of each power module to reduce EMI radiation, although such power-module based capacitors are not essential. For example, capacitors 240-242 each have first electrodes connected to positive DC input nodes 230-232, respectively, and each have second electrodes connected to ground nodes 236-238, respectively. Similarly, capacitors 244-246 each have first electrodes connected to negative DC input nodes 233-235, respectively, and each have second electrodes connected to ground nodes 236-238, respectively.

In another embodiment, first power module 224 has a second pair of capacitors connected in parallel to capacitors 240 and 244, although the second pairs of capacitors are not essential. Such a configuration may be used to reduce the internal resistances and inductances of the capacitors, thereby further reducing EMI radiation. That is, a first parallel capacitor 248 has a first electrode connected to positive DC input node 230, and has a second electrode connected to ground node 236, and is thus connected in parallel to first capacitor 240. Similarly, a second parallel capacitor 250 has a first electrode connected to negative DC input node 233, and has a second electrode connected to ground node 236, and is thus connected in parallel to second capacitor 244. A suitable balancing capacitor 252 may be coupled between positive and negative DC source conductors such as, for example, between positive and negative lines of cable assembly 208 (as shown) or between positive and negative nodes of busbar 216. Balancing capacitor 252 enhances the performance of the overall system by suppressing voltage oscillations between the positive DC and/or negative DC.

During operation, DC battery 192 provides DC input signals conducted through cable assembly 208 to busbar 216. Busbar 216 distributes this DC signal to positive and negative DC input nodes 230-232 and 233-235, respectively, of power modules 224-226. These power modules each provide a single-phase AC output signal directed toward a suitable AC system such as to a motor 254. According to an embodiment, common mode currents generated within DC battery assembly 188 and power inverter system 180 are shunted to ground from positive DC cables/nodes by capacitor 210 (and capacitor 218 if used), and from negative DC cables/nodes by capacitor 214 (and capacitor 219 if used), thereby reducing conducted and radiated emissions. According to another embodiment that includes capacitors 240-242 and 244-246 (and capacitors 248, 250, if used), common mode currents generated by power modules are shunted to ground from positive power input module nodes by capacitors 240-242 (and capacitor 248 if used), and to ground from negative power module input nodes by capacitors 244-246 (and capacitor 250 if used), thereby reducing conducted and radiated emissions. Additional capacitor pairings may be connected in parallel to first capacitor pairings as needed for DC battery assembly 188 and/or any of power modules 224-226, in various embodiments.

Figure 3:
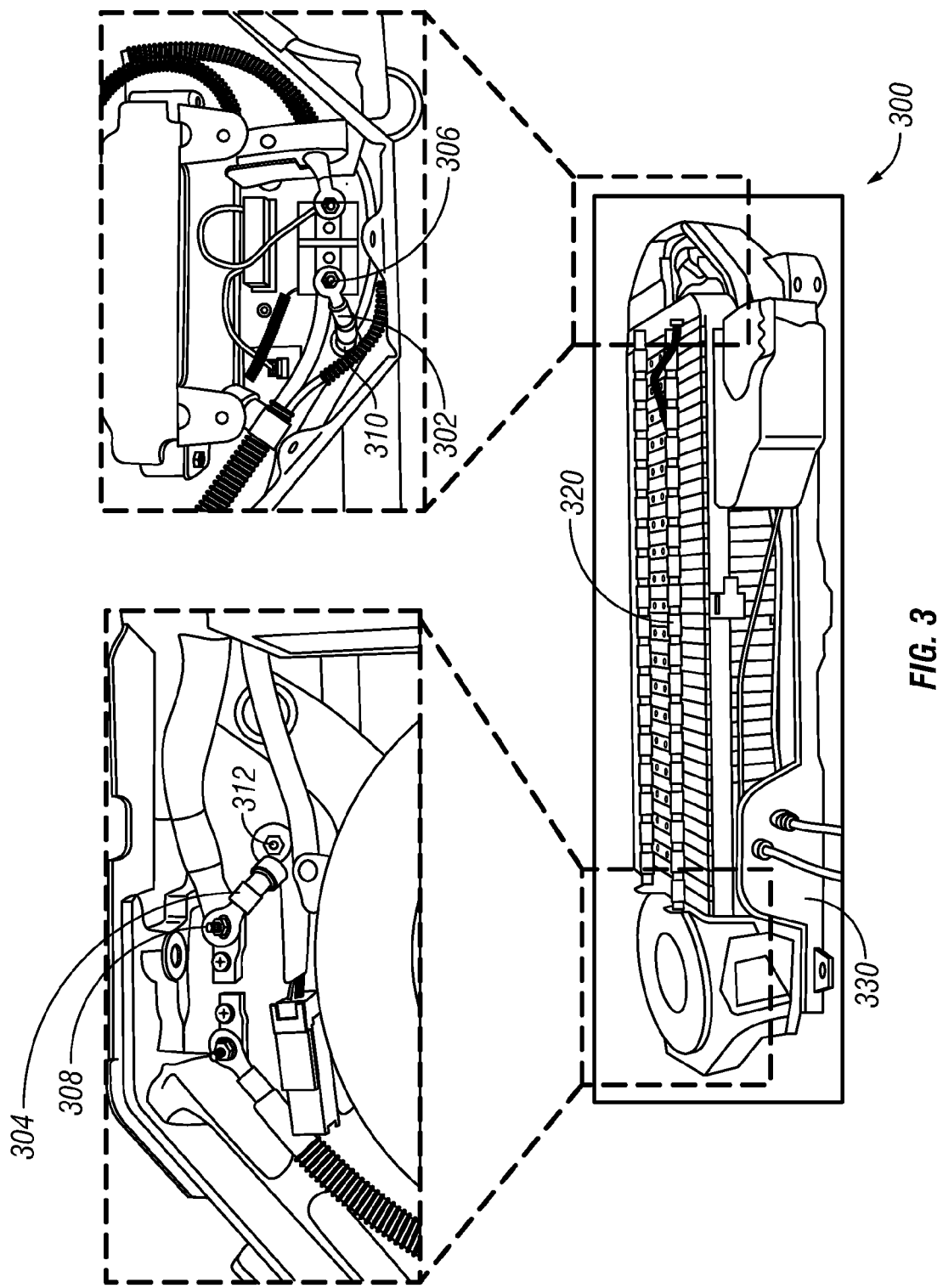
FIG. 3 is an exterior view of a DC source assembly that includes filter capacitors, in accordance with an example embodiment.

FIG. 3 is an exterior view of a DC source assembly 300 that includes filter capacitors 302, 304, in accordance with an example embodiment. More specifically, FIG. 3 shows an exterior view of an entire DC source assembly 300 (at the bottom of FIG. 3) and angled, enlarged views of the left and right side of the DC source assembly 300 (at the top left and right, respectively, of FIG. 3). Filter capacitors 302, 304 may correspond to filter capacitors 210, 214 (FIG. 2), for example. Although not specifically illustrated, DC source assembly 300 also may include additional filter capacitors corresponding to filter capacitors 218, 219 (FIG. 2), according to an embodiment. DC source assembly 300 further includes a battery pack having a plurality of cells 320 (e.g., a "DC source"), a positive terminal 308 coupled to an electrically positive node of the cells, and a negative terminal 306 coupled to an electrically negative node of the cells. DC source assembly 300 may include a housing 330 (referred to herein as "assembly housing"), which may comprise part of an electrically grounded vehicle chassis or which may be electrically coupled to an electrically grounded vehicle chassis. Assembly housing 330 may comprise a conductive material such that the assembly housing 330 is grounded to the vehicle chassis through the electrical coupling. Alternatively, assembly housing 330 may comprise a non-conductive material. DC source assembly 300 may also include at least one conductive member in electrical communication with the vehicle chassis, where the conductive member is suitable for the purpose of providing an electrical coupling or connection to the electrically grounded vehicle chassis, for example, in an embodiment in which assembly housing 330 is non-conductive.

In accordance with an embodiment, filter capacitor 302 has a first electrode electrically coupled to the positive terminal 306 (e.g., a contactor) of the cells 320 and a second electrode electrically coupled the assembly housing 330. Similarly, filter capacitor 304 has a first electrode electrically coupled to the negative terminal 308 (e.g., a contactor) of the cells 320 and a second electrode electrically coupled to the assembly housing 330. Filter capacitors 302, 304 may be coupled to assembly housing 330 through one or more housing terminals 310, 312, respectively. Housing terminals 310, 312 are an integral part of assembly housing 330, according to an embodiment. In accordance with an example embodiment, filter capacitors 302, 304 are directly physically connected to housing terminals 310, 312, respectively. In accordance with an example embodiment, filter capacitors 302, 304 are located within the interior of assembly housing 330 and are directly physically connected to the housing terminals 310, 312. In an alternate embodiment, filter capacitors 302, 304 may be located on the outside of assembly housing 330.

Figure 4:
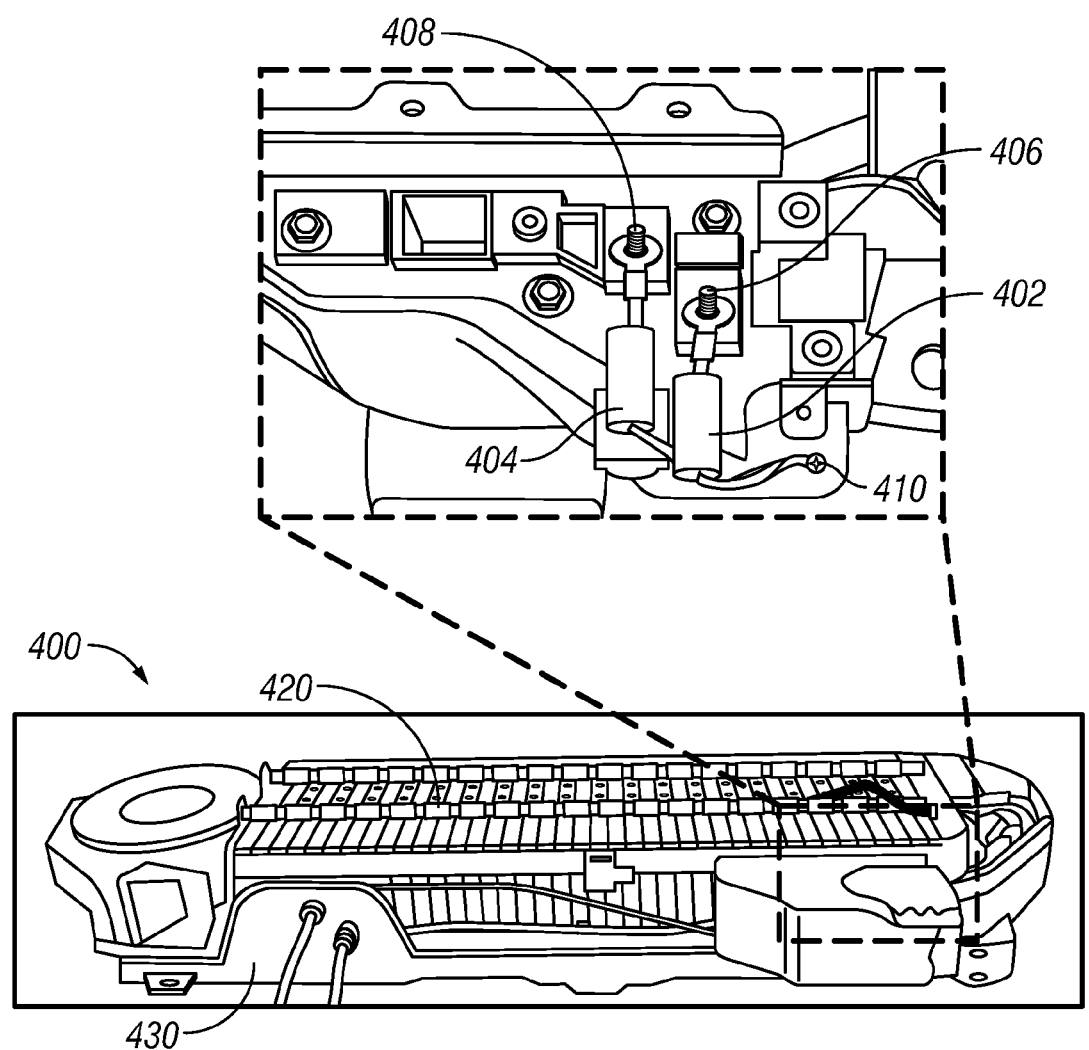
FIG. 4 is an exterior view of a DC source assembly that includes filter capacitors, in accordance with an example embodiment.

FIG. 4 is an exterior view of a DC source assembly 400 that includes filter capacitors 402, 404, in accordance with another example embodiment. More specifically, FIG. 4 shows an exterior view of an entire DC source assembly 400 (at the bottom of FIG. 4) and angled, enlarged view of a portion of the right side of the DC source assembly 400 (at the top of FIG. 4). Filter capacitors 402, 404 may correspond to filter capacitors 210, 214 (FIG. 2), for example. Although not specifically illustrated, DC source assembly 400 also may include additional filter capacitors corresponding to filter capacitors 218, 219 (FIG. 2), according to an embodiment. DC source assembly 400 further includes a battery pack having a plurality of cells 420 (e.g., a "DC source"), a positive terminal 406 coupled to an electrically positive node of the cells, and a negative terminal 408 coupled to an electrically negative node of the cells. DC source assembly 400 may include a housing 430, which may comprise part of an electrically grounded vehicle chassis or may be electrically coupled to (i.e., grounded to) an electrically grounded vehicle chassis. Assembly housing 430 may comprise a conductive material such that the assembly housing 430 is grounded to the vehicle chassis through the electrical coupling. Alternatively, assembly housing 430 may comprise a non-conductive material. DC source assembly 400 may also include at least one conductive member in electrical communication with the vehicle chassis suitable for the purpose of providing an electrical coupling or connection to the electrically grounded vehicle chassis, for example, in an embodiment in which assembly housing 430 is non-conductive.

In accordance with an embodiment, filter capacitor 402 is electrically coupled between the positive terminal 406 (e.g, a contactor) of the cells 420 and the assembly housing 430. Similarly, filter capacitor 404 is electrically coupled between the negative terminal 408 (e.g., a contactor) of the battery 420 and the assembly housing 430. Filter capacitors 402, 404 may be coupled to assembly housing 430 through one or more housing terminals 410 (only one is shown in FIG. 4), which may be an integral part of housing 430 and, as such, may be grounded to the vehicle chassis ground. In accordance with an example embodiment, filter capacitors 402, 404 are located on the outside of assembly housing 430 and are directly physically connected to the housing terminal 410. In an alternate embodiment, filter capacitors 402, 404 may be located on the interior of assembly housing 430.

In the example embodiments of FIG. 3 and FIG. 4, filter capacitors 302, 304, 402, 404 are shown to be located at particular locations. It is to be understood that these locations are shown for example purposes, and that filter capacitors alternatively may be located in different locations, particularly when incorporated into DC source assemblies having different physical configurations between components. In addition, although filter capacitors 302, 304, are shown in FIG. 3 to be located within the assembly housing 330 and filter capacitors 402, 404 are shown in FIG. 4 to be located outside of the assembly housing 430, one or more of filter capacitors 302, 304, 402, 404 or additional filter capacitors may be located internal or external to the assembly housing, in alternate embodiments.

Accordingly, the various embodiments described herein provide power module and DC source assemblies of the type suitable for integration into a vehicular power inverter system, and these modules and assemblies may provide reduced EMI radiation when compared with prior systems. Embodiments of DC source assemblies include one or more first capacitors coupled between vehicle ground and the positive DC source terminal, and one or more second capacitors coupled between ground and the negative DC source terminal. By integrating capacitors nearer the source of common mode currents in the DC source assemblies, the current loop area may be significantly decreased and, accordingly, associated EMI radiation also may be commensurately reduced. Further, when used externally to an inverter chassis and within a DC source assembly, capacitors are kept away heat sources and elevated temperatures thereby.

The preceding description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention. Furthermore, while in the preceding description, certain elements may be accompanied by descriptors such as "first" and "second," etc., it should be understood that the following claims may contain such descriptors used in a different manner consistent with the order in which these elements are introduced within the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A DC source assembly comprising:
    a DC source having a first terminal and a second terminal;
    a housing comprising a conductive material and having disposed within the DC source, a first capacitor, and a second capacitor;
    wherein the first capacitor has a first electrode electrically coupled to the housing and a second electrode electrically coupled to the first terminal; and
    wherein the second capacitor has a first electrode electrically coupled to the housing, and a second electrode electrically coupled to the second terminal.

2. The DC source assembly of claim 1, further comprising:
    a third capacitor having a first electrode electrically coupled to the housing, and having a second electrode electrically coupled to the first terminal; and
    a fourth capacitor having a first electrode electrically coupled to the housing, and having a second electrode electrically coupled to the second terminal.

3. The DC source assembly of claim 1, wherein the DC source assembly is disposed within a vehicle having an electrically grounded chassis and wherein the conductive member is electrically coupled to the chassis.

4. The DC source assembly of claim 3, wherein the DC source assembly is electrically coupled to a power inverter assembly comprising:
    a housing electrically coupled to the grounded vehicle chassis; and
    a power module disposed within the power inverter assembly housing, wherein the power module includes a third capacitor electrically connected between the power module and a ground node.

5. A power inverter system suitable for deployment in a vehicle, the vehicle having an electrically grounded chassis, the system comprising:
    a DC source assembly, the DC source assembly comprising:
    a housing comprising conductive material that is disposed within the vehicle and electrically coupled to the chassis,
    a DC source disposed within the housing and having a first terminal and a second terminal, and
    an EMI filter disposed within the housing and electrically coupled to the housing and the DC source; and
    a power inverter assembly electrically coupled to the DC source assembly.

6. The power inverter system of claim 5, wherein the EMI filter comprises:
    a first capacitor having a first electrode electrically coupled to the vehicle chassis and a second electrode electrically coupled to the first terminal of the DC source; and
    a second capacitor having a first electrode electrically coupled to the vehicle chassis and a second electrode electrically coupled to the second terminal of the DC source.

7. The power inverter system of claim 6, wherein the EMI filter further comprises:
    a third capacitor having a first electrode electrically coupled to the vehicle chassis and a second electrode electrically coupled to the first terminal of the DC source; and
    a fourth capacitor having a first electrode electrically coupled to the vehicle chassis and a second electrode electrically coupled to the second terminal of the DC source.

8. The power inverter system of claim 5, wherein the housing is grounded to the vehicle chassis.

9. The power inverter system of claim 5, wherein the power inverter assembly comprises:
    a chassis electrically coupled to the vehicle chassis;
    a power module housed within the chassis and comprising an IGBT/power diode pair; and
    a bus bar housed within the chassis and electrically coupled to the power module.

10. A DC source assembly for deployment in a vehicle, the vehicle having an electrically grounded chassis, the DC source assembly comprising:
    a housing comprising conductive material and electrically coupled to the vehicle chassis;
    a DC source disposed within the housing;
    a first terminal contactor electrically coupled to the DC source;
    a second terminal contactor electrically coupled to the DC source;
    a first capacitor disposed within the housing having a first electrode electrically coupled to the first terminal contactor and a second electrode electrically and physically, directly connected to the housing; and
    a second capacitor disposed within the housing having a first electrode electrically coupled to the second terminal contactor and a second electrode electrically and physically, directly connected to the housing.

11. The DC source assembly of claim 10 wherein the first capacitor and the second capacitor are disposed within the housing.

12. The DC source assembly of claim 10 wherein the first capacitor and the second capacitor comprise a polypropylene material.

13. The DC source assembly of claim 10 wherein the DC source assembly is electrically coupled to a power inverter assembly housed within the vehicle.

* * * * *